(12) United States Patent
Dodson et al.

(10) Patent No.: US 6,184,877 B1
(45) Date of Patent: *Feb. 6, 2001

(54) SYSTEM AND METHOD FOR INTERACTIVELY ACCESSING PROGRAM INFORMATION ON A TELEVISION

(75) Inventors: John Paul Dodson, Pflugerville; Hatim Yousef Amro, Austin, both of TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/764,695

(22) Filed: Dec. 11, 1996

(51) Int. Cl.[7] .............................. H04N 5/445; H04N 5/50
(52) U.S. Cl. ............................. 345/327; 348/12; 348/13; 348/564; 348/569
(58) Field of Search .................................... 348/7, 12, 13, 348/906, 563, 564, 565, 569, 468, 589, 2; 345/5.1, 4.2, 327

(56) References Cited

U.S. PATENT DOCUMENTS

| 4,706,121 | 11/1987 | Young ................................... 358/142 |
| 4,751,578 | 6/1988 | Reiter et al. ......................... 358/183 |
| 4,908,713 | 3/1990 | Levine ................................ 358/335 |
| 4,977,455 | 12/1990 | Young ................................... 358/142 |
| 5,151,789 | 9/1992 | Young ................................ 358/194.1 |
| 5,301,028 | 4/1994 | Banker et al. . |
| 5,353,121 | 10/1994 | Young et al. ......................... 348/563 |
| 5,373,288 | 12/1994 | Blahut . |
| 5,418,559 | 5/1995 | Blahut . |
| 5,434,626 | 7/1995 | Hayashi et al. . |
| 5,481,296 | * 1/1996 | Cragun .................................... 348/13 |
| 5,517,257 | 5/1996 | Dunn et al. . |
| 5,524,195 | 6/1996 | Clanton, III et al. . |
| 5,548,340 | * 8/1996 | Bertran ................................ 348/559 |
| 5,557,338 | 9/1996 | Maze et al. . |
| 5,585,838 | * 12/1996 | Lawler ................................... 348/13 |
| 5,629,730 | 5/1997 | Park ..................................... 347/188 |
| 5,629,733 | * 5/1997 | Youman ................................... 348/7 |
| 5,657,072 | * 8/1997 | Aristides ............................... 348/13 |
| 5,724,567 | * 3/1998 | Rose .................................... 395/602 |
| 5,732,216 | * 3/1998 | Logan ..................................... 348/7 |
| 5,734,853 | * 3/1998 | Hendricks et al. ...................... 348/7 |
| 5,801,787 | * 9/1998 | Schein ................................. 348/589 |
| 5,822,123 | * 1/2000 | Davis .................................. 348/564 |
| 5,835,087 | * 11/1998 | Herz ....................................... 348/1 |
| 5,850,218 | * 12/1998 | Lajoie ................................. 345/327 |
| 5,973,683 | * 10/1999 | Cragun ................................ 345/327 |
| 6,014,184 | * 1/2000 | Knee ................................... 348/564 |
| 6,020,883 | * 2/2000 | Herz .................................... 345/327 |
| 6,025,837 | * 2/2000 | Mathews .............................. 345/327 |

* cited by examiner

*Primary Examiner*—Jeffery Brier
*Assistant Examiner*—Wesner Sajous
(74) *Attorney, Agent, or Firm*—Sawyer Law Group LLP; Leslie Van Leeuwen

(57) ABSTRACT

The present invention relates to a system and method for accessing television program information, particularly context sensitive information, some of which may be found through the Internet.

A method and system according to the present invention is presented for interactively accessing program information on a television, the method comprising receiving a search request; generating at least one automatic search term regarding a program for television; and searching the Internet for requested information.

47 Claims, 9 Drawing Sheets

US 6,184,877 B1

SYSTEM AND METHOD FOR INTERACTIVELY ACCESSING PROGRAM INFORMATION ON A TELEVISION

RELATED APPLICATIONS

The present application is related to co-pending U.S. patent application Ser. No. 08/764,693, entitled "CONTEXT SENSITIVE ITV CHANNEL INFORMATION," and Ser. No. 08/764,694, entitled "SYSTEM AND METHOD FOR SAVING AND RETRIEVING TELEVISION PROGRAM INFORMATION SEARCHED THROUGH THE INTERNET," both filed Dec. 11, 1996, and assigned to the assignee of the present application.

TECHNICAL FIELD

The present invention relates to a system and method for accessing television program information, particularly context sensitive information, some of which may be found through the Internet.

BACKGROUND

Television program information can now be found displayed on the TV. However, the current ITV (Interactive TeleVision) model continues the old static T.V. model of centralized channel information. Channel information typically includes program start and stop times, program title and description.

Many current ITV systems utilize a set-top box working in conjunction with set-top software, and possibly a remote control. Set-top boxes have been used in various systems, including for table television, direct to home (DTH) video dial tone, and wireless cabled (MMDS). A set-top box can be coupled with a television set and may be used in conjunction with a remote control. The components of a typical set-top box may include a controller, a memory, a receiver for the remote control, and possibly an interface for the TV.

An example of the conventional ITV model is the "Prevue channel". All channel information is in one place. This can be awkward and frustrating to the viewer. For instance, the user may have to wait for a considerable amount of time to view information for a certain channel. Channel information for a specific channel may not be immediately available, since only a small number of channels are displayed at a given time. One limitation of the conventional program information services is that only the most basic information is typically provided. If the viewer desires to see other information related to a program, such as movie reviews or interviews with the writer of the program, the viewer is typically required to research the desired additional information elsewhere.

What is needed is a system and method which avoids these problems in the conventional system for displaying TV program information. The present invention addresses such a need.

SUMMARY

The present invention relates to a system and method for accessing television program information, particularly context sensitive information, some of which may be found through the Internet.

A method and system according to the present invention is presented for interactively accessing program information on a television, the method comprising receiving a search request regarding a television program; displaying at least one search term overlaid on a program being received by the television; searching the Internet for requested information; obtaining a result of the search; and saving the result in a memory coupled with the television.

DETAILED DESCRIPTION

The present invention relates to a system and method for accessing television program information, particularly context sensitive information, some of which may be found through on-line services, examples of which include America On Line and the Internet. The following description is presented to enable one of ordinary skill in the art to make and use the illustrative embodiment and is provided in the context of a patent application and its requirements. Various modifications to the illustrative embodiment will be readily apparent to those skilled in the art and the generic principles herein may be applied to other embodiments. Thus, the illustrative embodiment is not intended to be limited to the embodiment shown but is to be accorded the widest scope consistent with the principles and features described herein.

Figure 1:
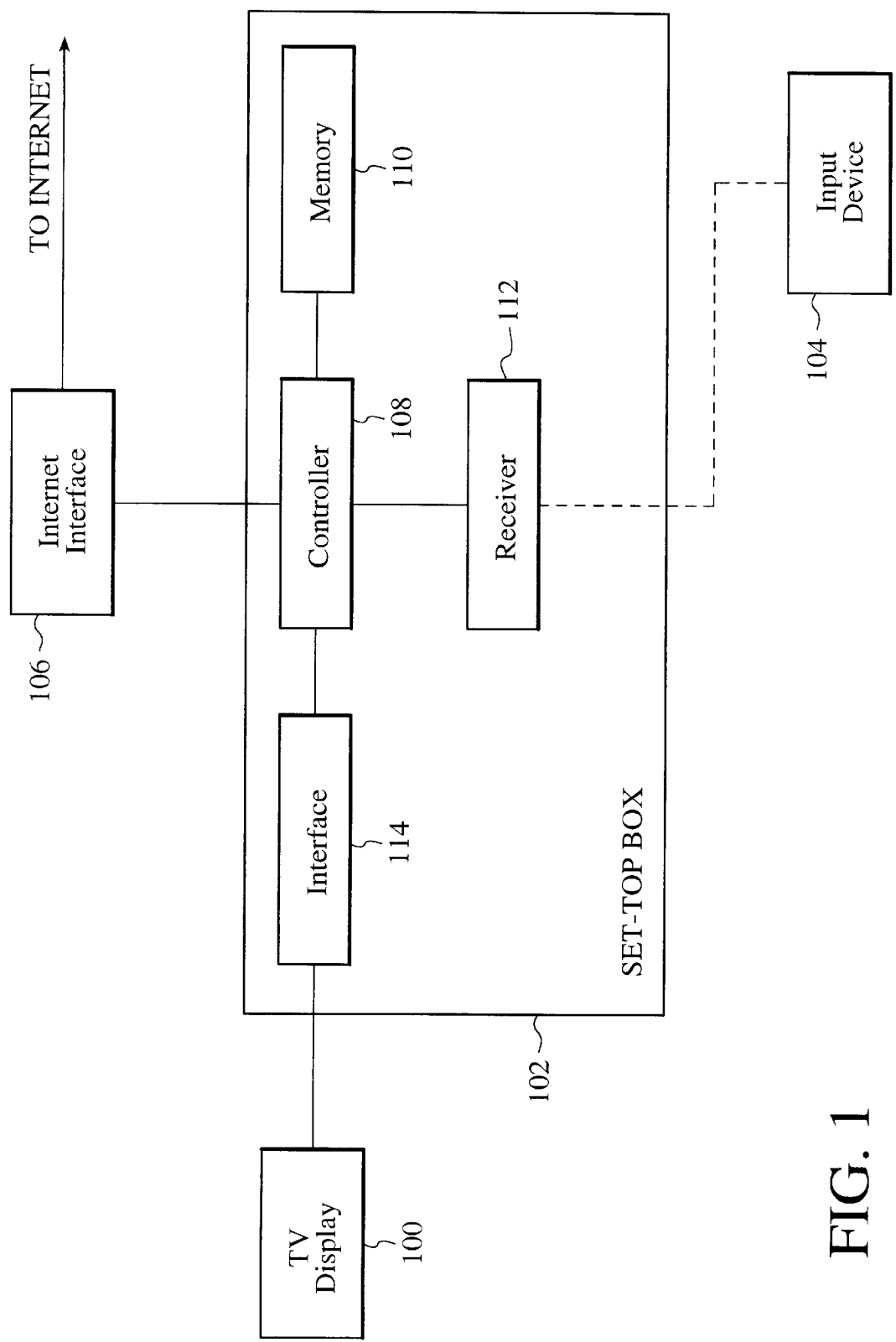
FIG. 1 is a system according to the present invention.

FIG. 1 is a system according to the present invention. It includes a TV display 100, a set-top box 102, an input device 104, and an Internet interface 106 which may be located either inside or outside the set-top box. The basic components of the set-top box 102 include an interface 114, a controller 108, a memory 110, and a receiver 112. The input device 104 may be any type of input device including a TV remote control or a keyboard. The receiver 112 would receive input from the input device 104. The controller 108 utilizes the input received by the receiver 112 and can access the memory 112, the Internet interface 106, and the interface 114, as required.

Figure 2:
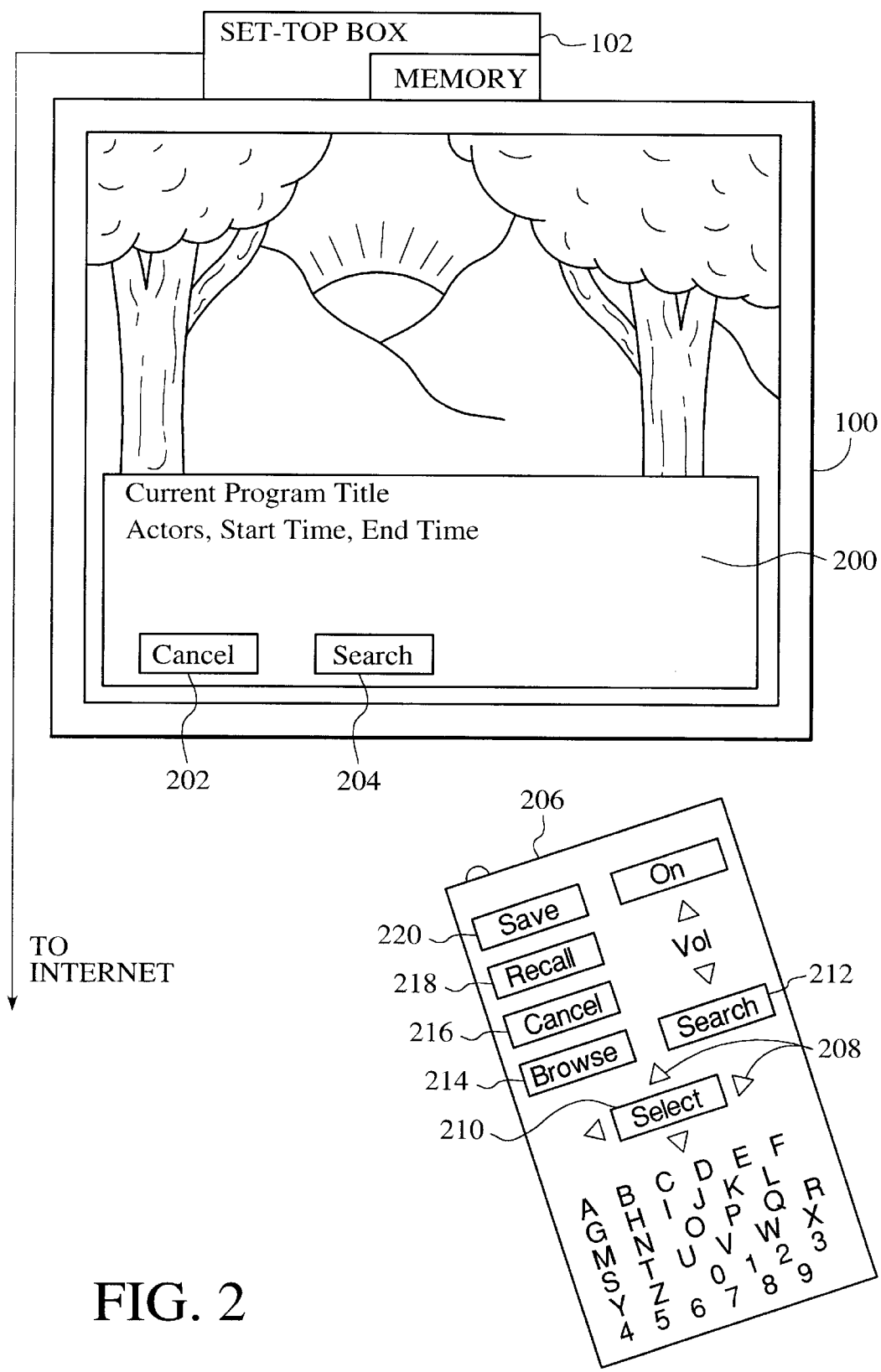
FIG. 2 is an example of an interactive content specific dialog overlaid onto a program being received by a TV.

FIG. 2 is an example of context-sensitive program information displayed on the TV display overlaid onto a program. Examples of context sensitive program information include current program title, the actors starring in the program, the start time, and the end time. This overlay 200 preferably appears when requested by a user.

The request can be made through the use of an input device 206 such as a remote control. The input device 206 preferably includes an overlay request such as a browse button 214. The overlay 200 can be cancelled or a search can be requested from the overlay 200. The overlay 200 can include a cancel indicator 202 and a search indicator 204 which can be selected by using the input device 206. The cancel and search functions can either be displayed and selected from the overlay 200, or cancel 216 and search 212 buttons may be included in the input device 216.

Figure 3:
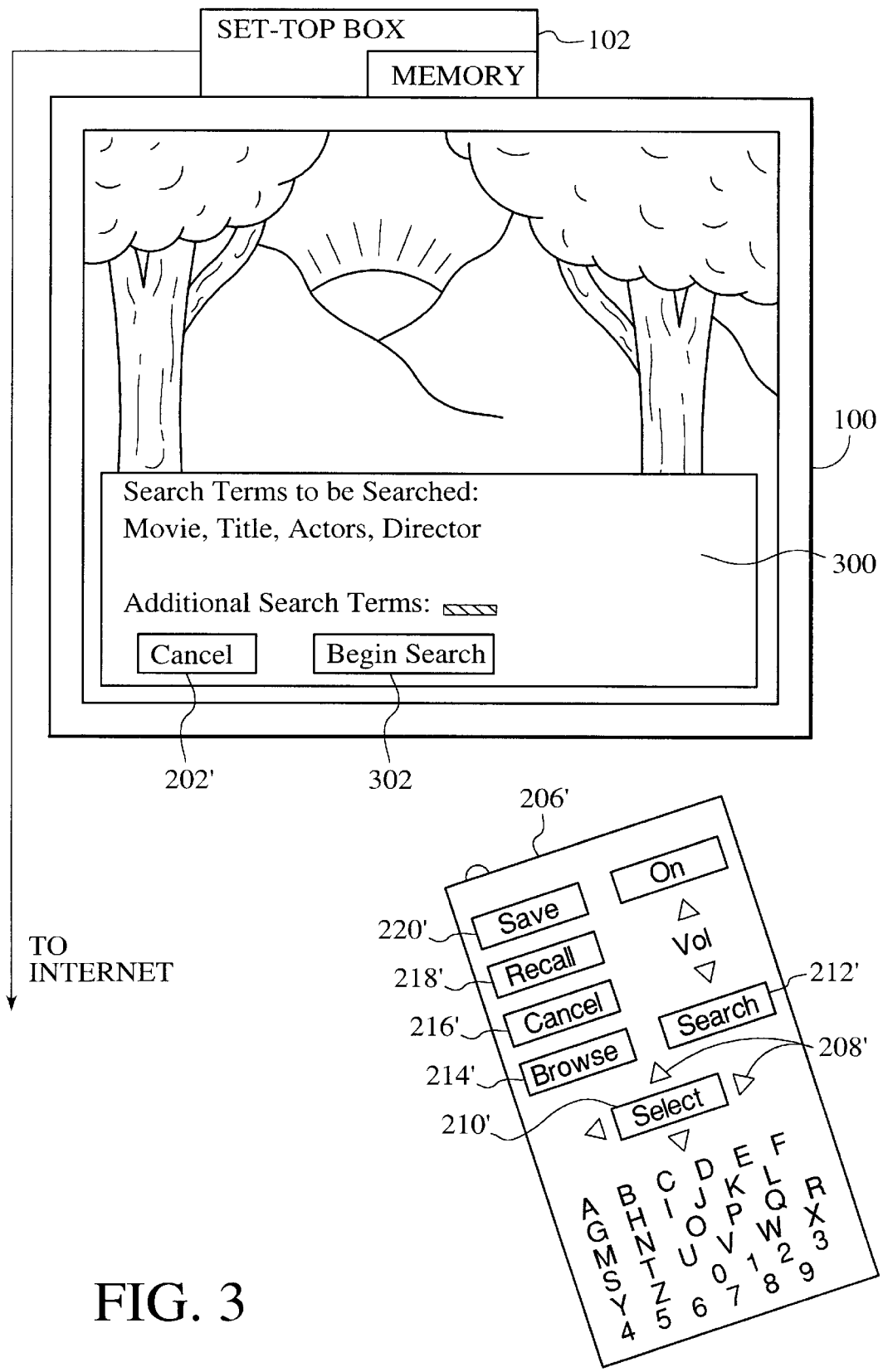
FIG. 3 is an interactive dialog overlaid onto a program in response to a search request.
Figure 4:
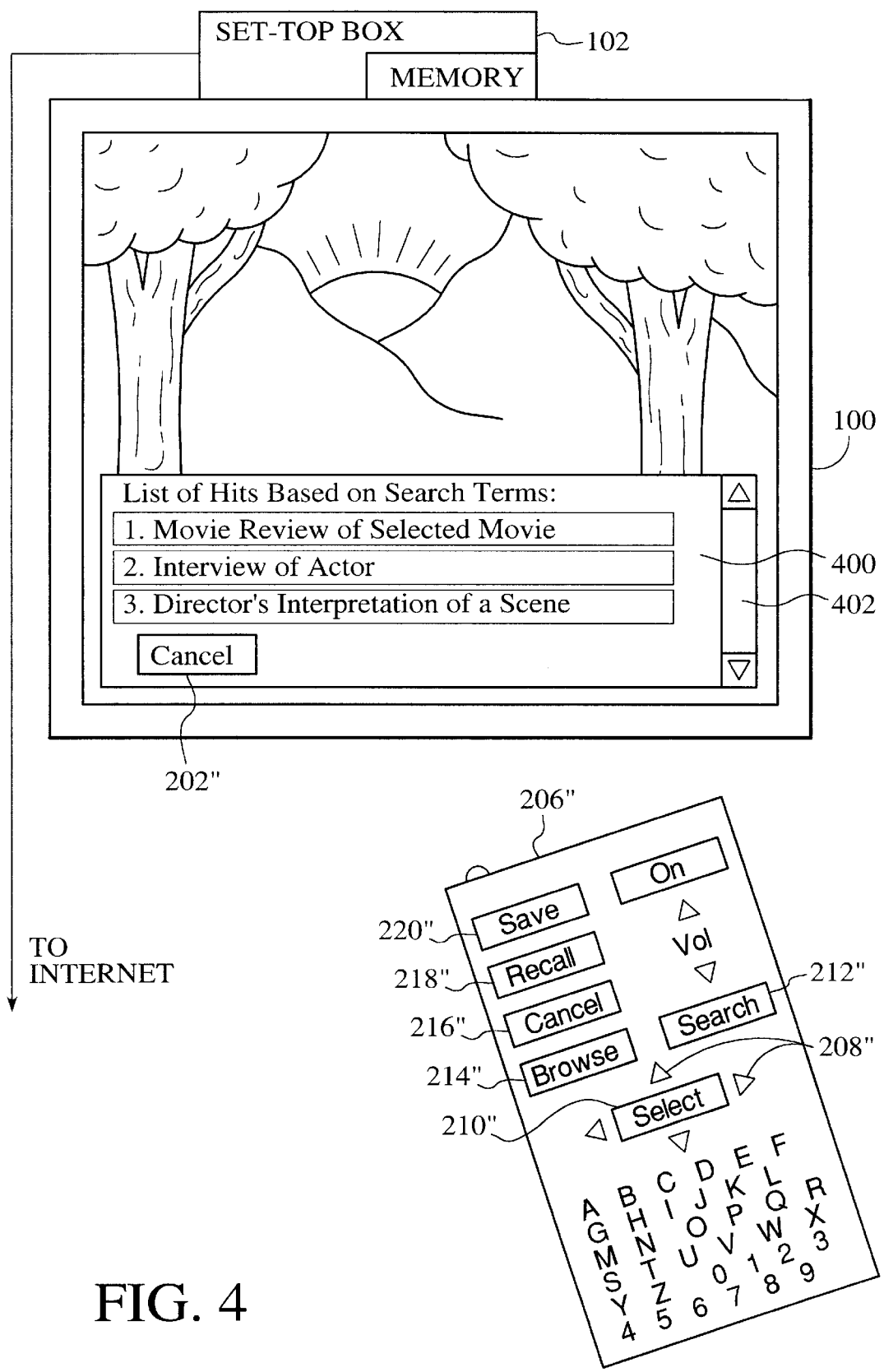
FIG. 4 is an example of an interactive dialog displaying a list of hits based on search terms.

If the search 204 is selected, a new overlay 300 appears which can be seen in FIG. 3. The overlay 300 preferably includes automatic search terms to be searched, such as the movie title, actors, and the director. The automatic search terms can be derived in various ways. One way is to access a program guide database maintained by a program guide provider such as a cable company. The database can be directly accessed at the cable company's location by using such devices as the internet interface 106 shown in FIG. 1, or a telephone line. If a current program guide is maintained in a database located in a set-top box, then the program guide can be accessed in the set-top box. The desired channel information is preferably assumed to be the current channel being displayed on the TV, and the assumed time is preferably the current time or a short time in the future such as half an hour. The information associated with that channel and time can be retrieved from the program guide database and displayed as the automatic search terms. In this manner, both the information overlaid on the program on the TV and the automatic search terms used for Internet search can be generated.

Search terms can be erased or added prior to beginning the search. The automatic search terms preferably either relate to the program currently being watched or a program which is to be watched in the future. One way the user can search a program to be watched in the future is to erase the automatic search terms and add additional search terms. The search function can be cancelled at any time by use of selection of the cancel option 202', or alternatively, by pressing a cancel button 216' in an input device. The user can also begin search by selecting the begin search option 302, or alternatively, by pressing the search button 212' on the input device 206'.

If the user elects to begin search, a new overlay 400 appears over the program. The overlay 400 includes a list of hits based on the search terms. Examples of the list of hits may include movie reviews of the selected movie, interviews with the actors, and directors' interpretation of a particular scene in a movie. A user may view the list of hits and decide to cancel the overlay 400 and return to the program, or the user may select one of the hits to view the text associated with the hit.

Figure 5:
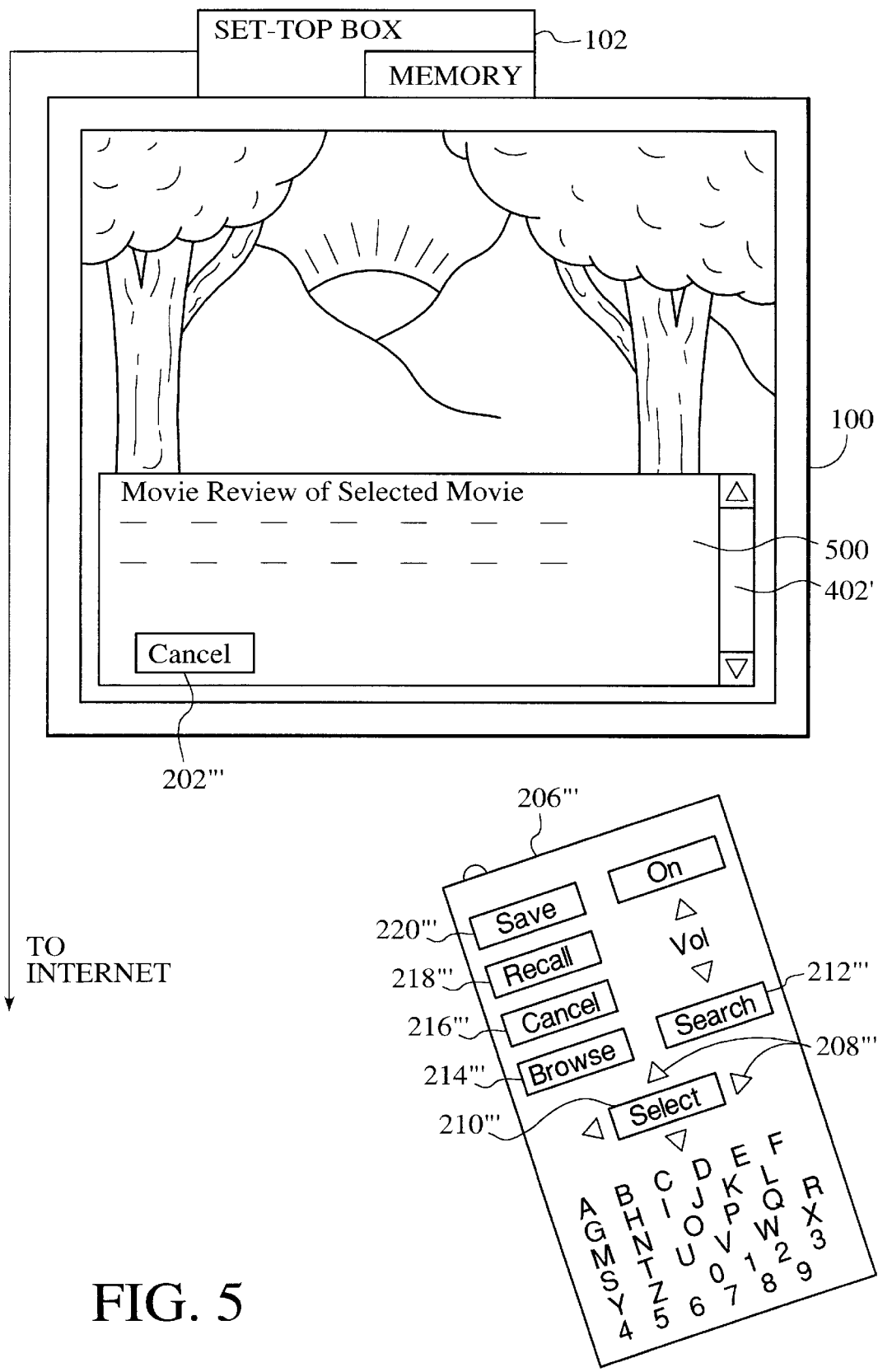
FIG. 5 is an example of an interactive dialog of text related to a selected hit resulting from a search.

FIG. 5 illustrates an example of an overlay 500 which appears when a hit is selected. An example of a hit which was selected may be the movie review of a selected movie. The overlay 500 may include a scroll bar 402' which allows the user to scroll up and down the text. Again, the overlay 500 may be cancelled at any time, via the cancel selection 202'" or a cancel button 216'" on the input device.

Figure 6:
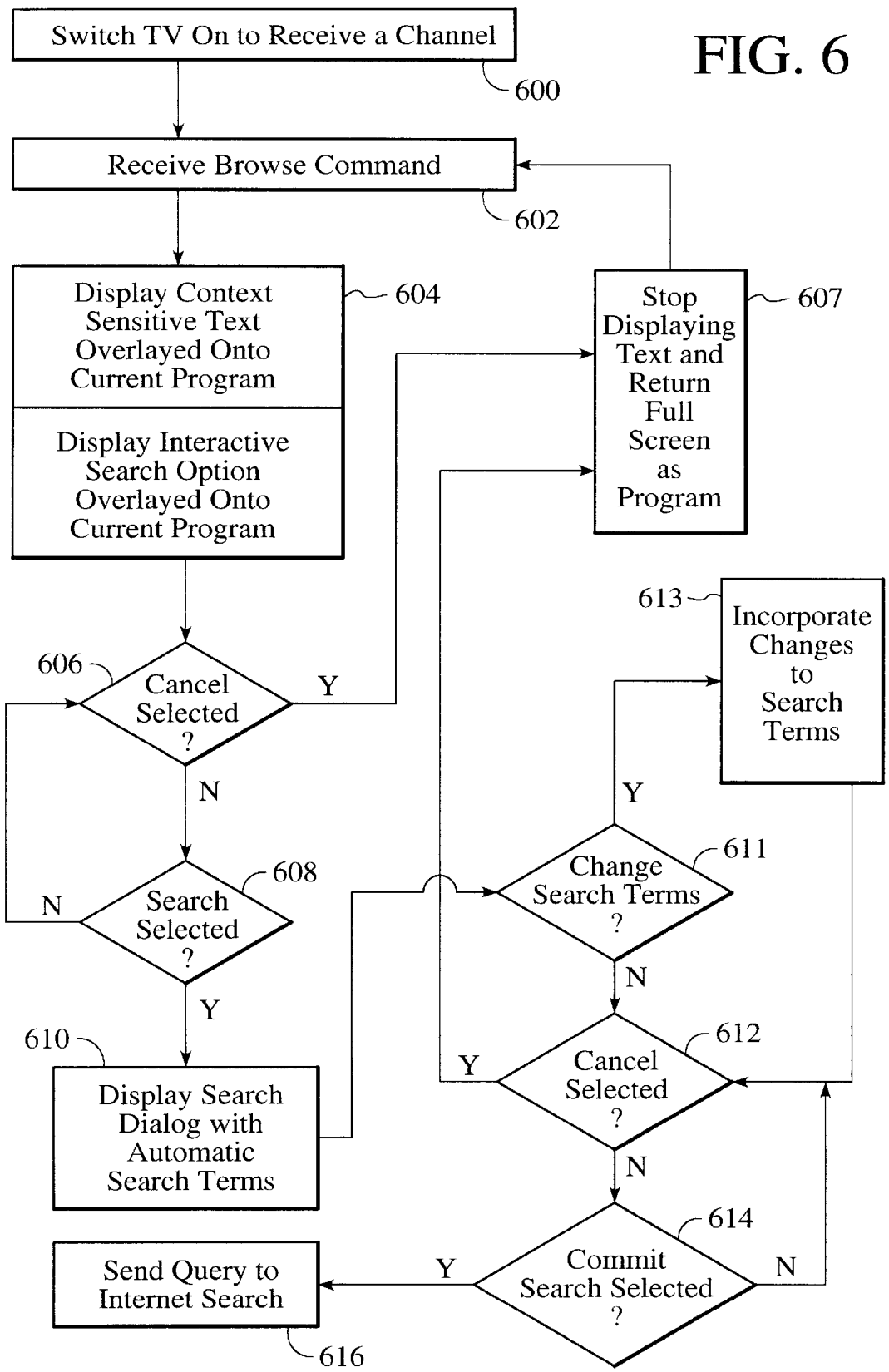
FIG. 6 is a flow diagram of a method according to the present invention for interactively displaying context sensitive text overlaid onto a program.

FIG. 6 is a flow diagram of a method according to the present invention for displaying context sensitive text overlaid onto a current program. A television is turned on to receive a television channel via step 600. Then a browse command is received via step 602. A browse command includes any type of command which requests information. Then context sensitive text is displayed overlaid onto the current program via step 604. Context sensitive text can include text describing programs such as the current program on the current channel, or a future program on the current channel.

An interactive search option can also be displayed via step 604. It is determined if a cancel option has been selected via step 606. If so, then the text is no longer displayed and the current program is returned to the full screen. If, however, a cancel option has not been selected, then it is determined if a search option has been selected, via step 608. If no search option has been selected, it is again determined if a cancel option has been selected via step 606.

If a search option has been selected, then a search dialog is displayed via step 610. The search dialog preferably includes search terms which are automatically selected in the manner previously described. The search dialog also includes options for changing, deleting, or adding search terms. It is then determined if changes are to be made to the search terms via step 611. If so, then changes entered through the input device are incorporated into the search terms via step 613.

It is again determined if a cancel option has been selected via step 612. If so, then the text is no longer displayed and the current program is returned to the full screen via step 607.

If a cancel option has not been selected via step 612, then it is determined if a commit search option has been selected via step 614. The commit search option includes any input which indicates that the search is to proceed. If no commit search option has been selected, then it is again determined if a cancel option has been selected via step 612.

If, however, a commit search option has been selected via step 614, then a query is sent to search the Internet via step 616. This query includes the final set of search terms which has been selected by the user. The final set may include some or all of the automatic search terms in addition to any additional search terms which the user may have selected.

Figure 7:
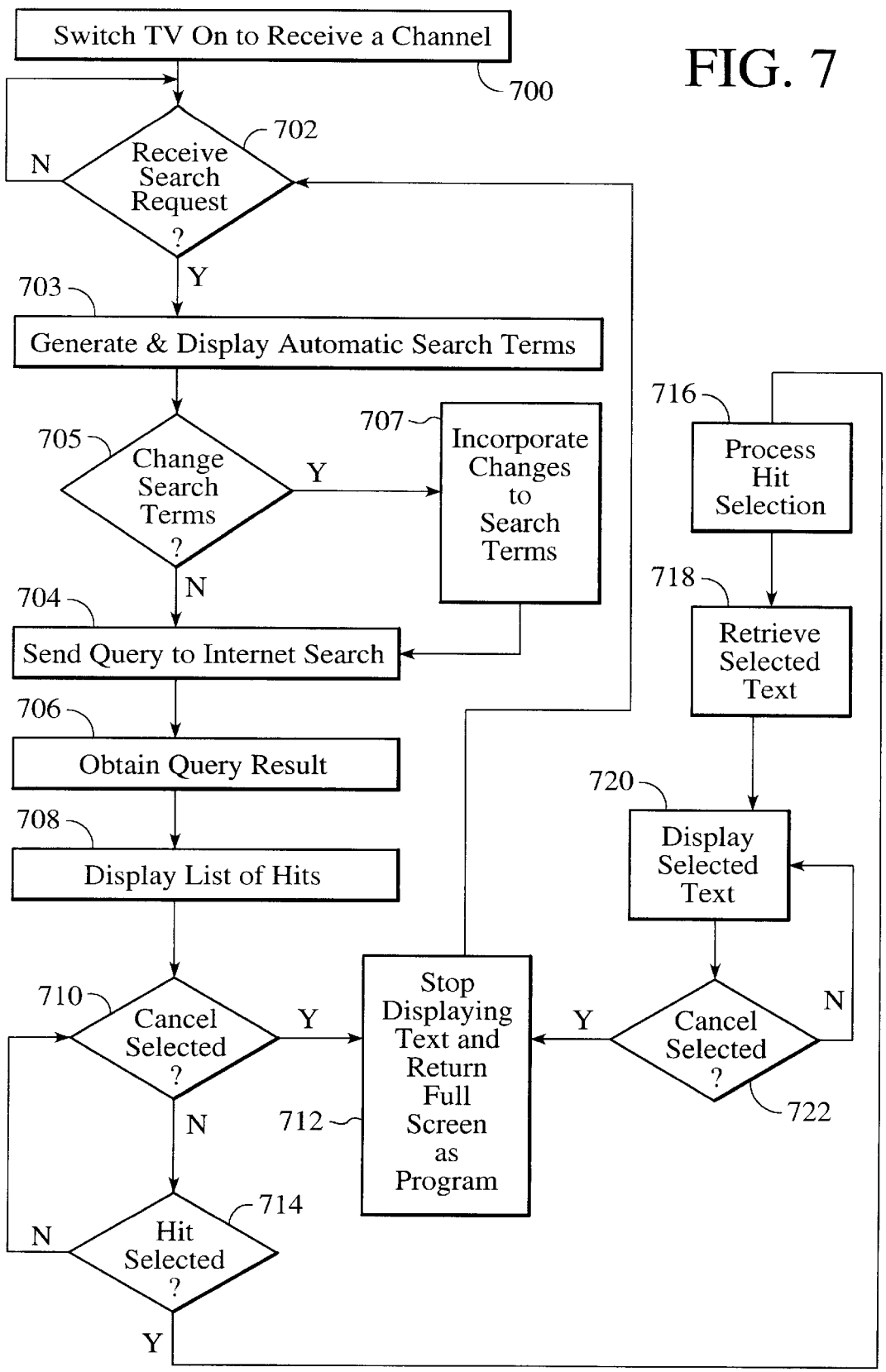
FIG. 7 is a flow diagram of a method according to the present invention for interactively retrieving context sensitive information and displaying the results on the television overlaid onto a program.

FIG. 7 is a flow diagram of a method according to the present invention for retrieving requested information from the Internet to be overlaid onto a program on the television set. The television is switched on to receive a channel via step 700. It is then determined if a search request has been received via step 702. If not, then it is again determined if a search request was received, via step 702.

If a search request has been received, then automatic search terms are generated and displayed via step 703. As previously discussed, the automatic search terms are preferably generated by using information which is being provided by a program guide database by a program guide provider. It is then determined if there are to be any changes to the search terms, such as deletion, addition, or modification of the displayed search terms via step 705. If the user enters changes to the search terms, these changes are incorporated via step 707.

If no changes are to be made, or alternatively, once the changes have been made, a query is sent to the Internet for a search, via step 704. The query can be limited to a program category, such as sports or movies, to limit the number of hits to a reasonable number. The categories can also be generated as an automatic search term, assuming the program guide provider has identified the programs into categories.

The query results are obtained via step 706 and a list of hits is displayed via step 708. It is determined if a cancel option has been selected via step 710. If so, then the displaying of the text is stopped and the program is returned to the full screen via step 712. It is then determined if a new search request has been received via step 702.

If a cancel option has not been selected via step 710, then it is determined if a hit has been selected, via step 714. If not, it is again determined if a cancel option has been selected via step 710. If a hit from the list of hits has been selected via step 714, then the hit selection is processed via step 716. The selected text is then retrieved via step 718 and the selected text is displayed via step 720. If a cancel option has not been selected via step 722, then the selected text is continued to be displayed. However, if a cancel option has been selected, then the text is no longer displayed and the full screen is returned to the program via step 712.

Figure 8:
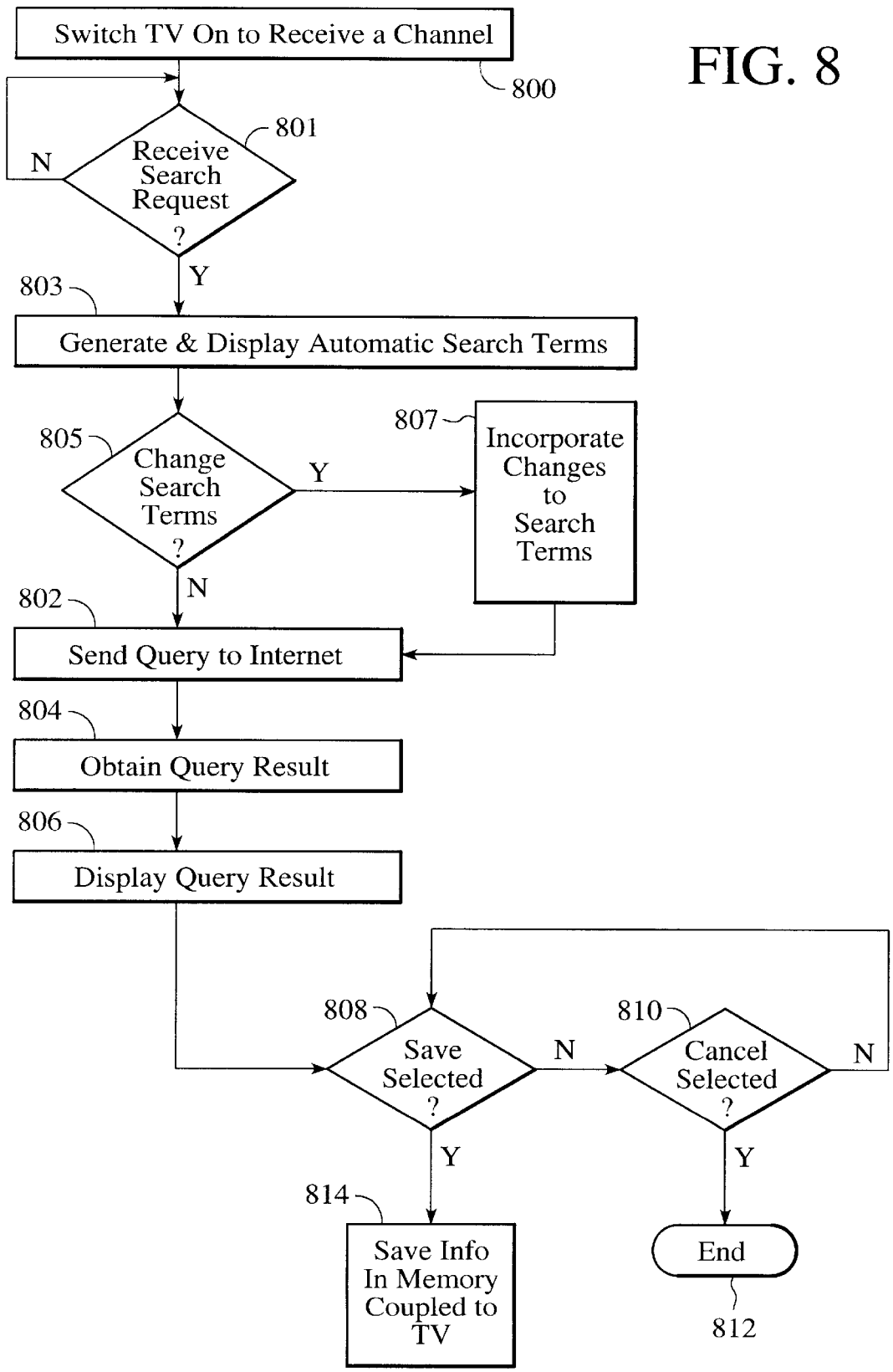
FIG. 8 is a flow diagram of a method according to the present invention for saving context sensitive information retrieved from the Internet in a memory coupled to the TV.

FIG. 8 is a flow diagram of a method according to the present invention for saving the results of an Internet search which can be initiated for search terms which are automatically generated. The TV is switched on to receive a channel via step 800. It is determined if a search request has been received via step 801. If not, then it is continually determined if a search request has been received via step 801. When a search request is received, then automatic search terms are generated and displayed via step 803.

It is then determined if the search terms are to be changed via step 805. If changes, including additions, deletions, and modifications, to the search terms are inputted, then the changes are incorporated via step 807. A query is sent to the Internet via step 802, and the query results are returned via step 804. The query results are then displayed via step 806.

It is then determined if a save option has been selected via step 808. If not, it is determined if a cancel option has been selected via step 810. If a cancel option has not been selected, then it is again determined if a save option has been selected. If a save option has been selected via step 808, then the information is saved in the memory which is coupled to the TV via step 814.

Figure 9:
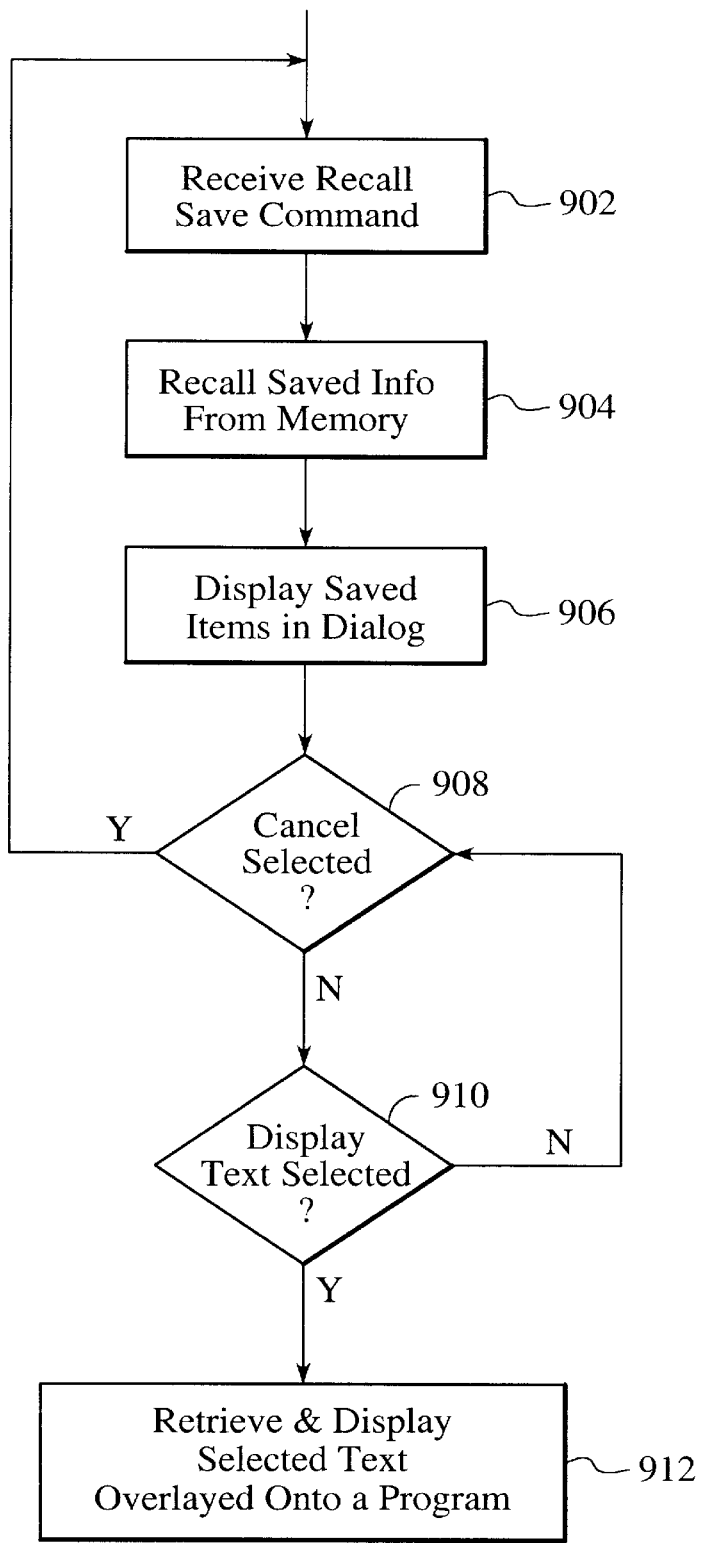
FIG. 9 is a flow diagram of a method according to the present invention for recalling saved context sensitive information and displaying the recalled information onto the TV.

FIG. 9 is a flow diagram of a method according to the present invention for recalling saved information derived from the Internet by using automatically generated search terms. A recall save command is received via step 902. Saved information from the memory is recalled via step 904. The saved items are displayed in a dialog, preferably overlaid onto a program on the television, via step 906.

It is then determined if a cancel option has been selected via step 908. If so, then the next recall save command can be processed when it occurs via step 902. If a cancel option has not been selected via step 908, then it is determined if any of the displayed items has been selected to view text associated with it via step 910. If not, it is again determined if a cancel option has been selected via step 908. If the display text option has been selected via step 910, then the selected text is retrieved and displayed, preferably overlaid onto the program, via step 912.

A method and system for interactively displaying program information on a television has been disclosed. Software written according to the present invention is to be stored in some form of computer readable medium, such as memory or CD-ROM, or transmitted over a network, and executed by a processor.

Although the system and method has been described in accordance with the embodiments shown, one of ordinary skill in the art will readily recognize that there could be variations to the embodiments and those variations would be within the spirit and scope of the above-described system and method. Accordingly, many modifications may be made by one of ordinary skill in the art without departing from the spirit and scope of the appended claims.

What is claimed is:

1. A method for interactively accessing program information on a television, the method comprising:
    a) receiving a search request;
    b) generating at least one automatic search term regarding a program for television based upon the search request;
    c) searching an on-line service for the program information, the on-line service including context sensitive information separate from the program, the search being based upon the automatic search term; and
    d) providing at least one result of the searching step (c) to the television, the at least one result capable of including information separate from the program or from scheduling or content information for the program.

2. The method of claim 1, further comprising a step of incorporating changes to the at least one automatic search term.

3. The method of claim 2, wherein changes to the at least one automatic search term include adding a search term.

4. The method of claim 2, wherein changes to the at least one automatic search term include deleting a search term.

5. The method of claim 1, wherein the automatic search term is displayed on the television.

6. The method of claim 5, wherein the automatic search term is overlaid onto a current program on the television.

7. The method of claim 1 wherein the at least one result providing step (d) further includes the step of displaying a list of at least one hit returned from the search on the Internet.

8. The method of claim 7, wherein the at least one hit is selectable to display text associated with it.

9. The method of claim 1, wherein the steps of the method are stopped when a cancel request is received.

10. The method of claim 1, wherein the search request is received via an input device.

11. The method of claim 1, wherein the at least one automatic search term is related to a current program on the television.

12. The method of claim 1, wherein the at least one automatic search term is related to a program to be received on a selected channel on the television.

13. The method of claim 12, wherein the selected channel is selected by tuning into the channel on the television.

14. The method of claim 1, wherein the at least one automatic search term is related to a program which will be received next on a selected channel on the television.

15. The method of claim 1, wherein the context sensitive information further includes information other than scheduling information.

16. The method of claim 1 wherein the at least one result can further include reviews of a particular program.

17. The method of claim 1 wherein the at least one result can further include interviews with actors in a particular program.

18. The method of claim 1 wherein the at least one result can further include interviews with a director of a particular program.

19. The method of claim 1 further comprising the step of:
    e) saving the at least one result to a memory coupled with the television.

20. A system for interactively accessing program information on a television, the system comprising:
    a television;
    an input device for inputting information;
    a receiver for receiving the information inputted from the input device;

an interface for accessing an on-line service; and a controller coupled to the television, the receiver, and the internet interface for processing input inputted by the input device, the controller for receiving a search request, for generating at least one automatic search term regarding a program for television, for searching an on-line service for the program information in response to the search request, the on-line service including context sensitive information separate from the program and for providing at least one result of the search step to the television, the at least one result capable of including information separate from the program or from scheduling or content information for the program.

21. The system of claim 20, wherein the controller searches the Internet for requested information.

22. The system of claim 20, wherein the context sensitive information further includes information other than scheduling information.

23. The system of claim 20 wherein the at least one result can further include reviews of a particular program.

24. The system of claim 20 wherein the at least one result can further include interviews with actors in a particular program.

25. The system of claim 20 wherein the at least one result can further include interviews with a director of a particular program.

26. The system of claim 19 further comprising:

a memory coupled with the television for saving the at least one result.

27. A computer readable medium containing program instructions for interactively accessing program information on a television, the program instructions comprising:

a) receiving a search request;

b) generating at least one automatic search term regarding a program for television;

c) searching an on-line service for the program information, the on-line service including context sensitive information separate from the program, the search being based upon the automatic search term; and d) providing at least one result of the searching instructions (c) to the television, the at least one result capable of including information separate from the program or from scheduling or content information for the program.

28. The computer readable medium of claim 27, wherein the context sensitive information further includes information other than scheduling information.

29. The computer readable medium of claim 27 wherein the at least one result can further include reviews of a particular program.

30. The computer readable medium of claim 27 wherein the at least one result can further include interviews with actors in a particular program.

31. The computer readable medium of claim 27 wherein the at least one result can further include interviews with a director of a particular program.

32. The computer-readable medium of claim 27 wherein the program further includes instructions for:

e) saving the at least one result to a memory coupled with the television.

33. A method for interactively displaying program information on a television, the method comprising:

a) receiving a search request;

b) displaying at least one search term overlaid onto a program being received by the television;

c) searching an on-line service for the program information, the on-line service including context sensitive information separate from the program; and d) providing at least one result of the searching step (c) to the television, the at least one result capable of including information separate from the program or from scheduling or content information for the program.

34. The method of claim 33, wherein the at least one search term is automatically generated.

35. The method of claim 33, wherein the on-line service is the Internet.

36. The method of claim 33, wherein the context sensitive information further includes information other than scheduling information.

37. The method of claim 33 wherein the at least one result can further include reviews of a particular program.

38. The method of claim 33 wherein the at least one result can further include interviews with actors in a particular program.

39. The method of claim 33 wherein the at least one result can further include interviews with a director of a particular program.

40. The method of claim 33 further comprising the step of:

e) saving the at least one result to a memory coupled with the television.

41. A computer readable medium containing program instructions for interactively accessing program information on a television, the program instructions comprising:

a) receiving a search request;

b) displaying at least one search term overlaid onto a program being received by the television;

c) searching an on-line service for the program information, the on-line service including context sensitive information separate from the program; and d) providing at least one result of the searching instructions (c) to the television, the at least one result capable of including context sensitive information separate from the program or scheduling information for the program.

42. The computer readable medium of claim 41, wherein the on-line service is the Internet.

43. The computer readable medium of claim 41, wherein the context sensitive information further includes information other than scheduling information.

44. The computer readable medium of claim 41 wherein the at least one result can further include reviews of a particular program.

45. The computer readable medium of claim 41 wherein the at least one result can further include interviews with actors in a particular program.

46. The computer readable medium of claim 41 wherein the at least one result can further include interviews with a director of a particular program.

47. The computer-readable medium of claim 41 wherein the program further includes instructions for:

e) saving the at least one result to a memory coupled with the television.

* * * * *